(12) United States Patent
Bhat et al.

(10) Patent No.: US 10,147,219 B2
(45) Date of Patent: *Dec. 4, 2018

(54) DETERMINING CONTROL VALUES OF AN ANIMATION MODEL USING PERFORMANCE CAPTURE

(71) Applicant: Lucasfilm Entertainment Company Ltd., San Francisco, CA (US)

(72) Inventors: Kiran Bhat, San Francisco, CA (US); Michael Koperwas, San Francisco, CA (US); Jeffery Yost, San Francisco, CA (US); Ji Hun Yu, Foster City, CA (US); Sheila Santos, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,727

(22) Filed: Feb. 3, 2017

(65) Prior Publication Data

US 2017/0148201 A1    May 25, 2017

Related U.S. Application Data

(63) Continuation of application No. 14/704,796, filed on May 5, 2015, now Pat. No. 9,600,742.

(51) Int. Cl.
| | |
|---|---|
| *G06T 13/40* | (2011.01) |
| *G06K 9/00* | (2006.01) |
| *G06T 7/73* | (2017.01) |
| *G06K 9/62* | (2006.01) |
| *G06T 13/80* | (2011.01) |
| *G06T 7/60* | (2017.01) |

(52) U.S. Cl.
CPC .......... *G06T 13/40* (2013.01); *G06K 9/00315* (2013.01); *G06K 9/6201* (2013.01);
(Continued)

(58) Field of Classification Search
CPC ......... G06T 13/40; G06T 13/00; G06T 13/80; G06T 13/20; G06T 3/0093; A63F 13/10
See application file for complete search history.

(56) References Cited

U.S. PATENT DOCUMENTS

| | | |
|---|---|---|
| 8,035,643 B2 | 10/2011 | Pighin et al. |
| 8,207,971 B1 | 6/2012 | Koperwas et al. |
| (Continued) | | |

OTHER PUBLICATIONS

"U.S. Appl. No. 13/168,389, filed Jun. 24, 2011".
(Continued)

*Primary Examiner* — Todd Buttram
(74) *Attorney, Agent, or Firm* — Kilpatrick Townsend & Stockton LLP

(57) ABSTRACT

Performance capture systems and techniques are provided for capturing a performance of a subject and reproducing an animated performance that tracks the subject's performance. For example, systems and techniques are provided for determining control values for controlling an animation model to define features of a computer-generated representation of a subject based on the performance. A method may include obtaining input data corresponding to a pose performed by the subject, the input data including position information defining positions on a face of the subject. The method may further include obtaining an animation model for the subject that includes adjustable controls that control the animation model to define facial features of the computer-generated representation of the face, and matching one or more of the positions on the face with one or more corresponding positions on the animation model. The matching includes using an objective function to project an error onto a control space of the animation model. The method may further include determining, using the projected error and one or more constraints on the adjustable controls, one or more values for one or more of the adjustable
(Continued)

controls. The values are configured to control the animation model to cause the computer-generated representation to perform a representation of the pose using the one or more adjustable controls.

20 Claims, 12 Drawing Sheets

(52) U.S. Cl.
CPC .................. *G06T 7/60* (2013.01); *G06T 7/75* (2017.01); *G06T 13/80* (2013.01); *G06T 2207/10016* (2013.01); *G06T 2207/30201* (2013.01)

(56) References Cited

U.S. PATENT DOCUMENTS

| | | | |
|---|---|---|---|
| 8,854,376 B1 | 10/2014 | Bhat et al. | |
| 9,104,908 B1* | 8/2015 | Rogers | G06K 9/00315 |
| 9,600,742 B2* | 3/2017 | Bhat | G06K 9/6201 |
| 2006/0012601 A1* | 1/2006 | Francini | G06T 13/205 |
| | | | 345/473 |
| 2010/0156910 A1* | 6/2010 | Roble | G06T 13/40 |
| | | | 345/473 |
| 2015/0213604 A1* | 7/2015 | Li | G06T 13/40 |
| | | | 345/473 |
| 2016/0328628 A1 | 11/2016 | Bhat et al. | |

OTHER PUBLICATIONS

"U.S. Appl. No. 13/361,350, filed Jan. 30, 2012".
"U.S. Appl. No. 13/839,243, filed Mar. 15, 2013".
"Non-Final Office Action", dated Jul. 26, 2016, from U.S. Appl. No. 14/704,796, 7 pages.
"Notice of Allowance" dated Nov. 9, 2016, from U.S. Appl. No. 14/704,796, 7 pages.
Bhat et al., "High Fidelity Facial Animation Capture and Retargeting With Contours," SCA 2013 (SIGGRAPH/Eurographics Symposium on Computer Animation).

* cited by examiner (a)　　　　　　　　　　(b)

(c)　　　　　　　　　　(d)

DETERMINING CONTROL VALUES OF AN ANIMATION MODEL USING PERFORMANCE CAPTURE

CROSS-REFERENCE TO RELATED APPLICATIONS

This application is a continuation of U.S. application Ser. No. 14/704,796, filed May 5, 2015, and entitled "DETERMINING CONTROL VALUES OF AN ANIMATION MODEL USING PERFORMANCE CAPTURE", which is hereby incorporated by reference in its entirety.

FIELD

The present disclosure generally relates to capturing performance characteristics of a subject. For example, performance capture systems and techniques may be provided for capturing performance characteristics of a subject.

BACKGROUND

Performance capture is an important aspect in animation. Providing a realistic animation of a subject or a fictional character representing the subject requires that a subject's performance is effectively captured. For example, an effective performance capture ensures that the nuances of the subject's performance are conveyed in the animation. Transfer of the performance of the subject onto a computer-generated representation of the subject or fictional character can be a complex and difficult process. Embodiments of the invention address these and other problems both individually and collectively.

SUMMARY

Techniques and systems are described for capturing performance characteristics of a subject. Using input data obtained from video images of the subject performing one or more poses, a solver may determine values for adjustable controls of an animation model for the subject. In some examples, the input data can include position information defining positions on the subject and may further include contour information defining contour features of the subject. The animation model includes various adjustable controls that control the animation model. Different control values for the adjustable controls allow the animation model to define different feature configurations of a computer-generated representation of the subject. The values for the different adjustable controls determined from the input data are used to control the features of the computer-generated representation of the subject to match the features of the subject during the performance. The values may further be used to determine control values for an animation model of a fictional character that represents the subject (e.g., a character played by the subject in an animated movie, game, or other multimedia).

The solver may include a minimizer that uses the input data and an objective function in combination with one or more constraints to determine the values. For example, the minimizer may match data of the animation model with the input data using the objective function and the constraints. In some examples, the objective function can match positions on the subject with corresponding positions on the subject's animation model in order to effectively transfer the subject's performance to the animation model. The constraints operate to reduce the degrees of freedom that the solver has to consider when solving for the values. For example, the constraints may be used to limit the adjustable controls that can be used to control the features of the computer-generated representation of the subject, to constrain an amount by which the adjustable controls can be adjusted, or to place other limitations on the adjustable controls. By using the constraints when determining the values, the solver produces control values for the subject's animation model that are intuitive to an animator. In some cases, an animator may determine that edits to the adjustable controls are needed. For example, the animator may want a character portraying the subject (e.g., the computer-generated representation of the subject, a fictional character that is played by the subject, or the like) to have different features than those depicted by the subject during a performance. The animator may adjust the control values of the adjustable controls to achieve the different features. An intuitive set of control values allows the animator to effectively and quickly edit the adjustable controls.

In some embodiments, an animation guide or recipe may be generated and used to guide the solver in determining which adjustable controls to use, which values to use for the adjustable controls, or the like. The animation guide can be generated based on the performance of the subject, and can further reduce the degrees of freedom that the solver must consider when solving for the adjustable control values. For example, a subject (for a given scene or for an entire production) may typically perform a limited number of poses or expressions. An animation guide for that subject can be created and used to limit the adjustable controls of that subject's animation model to those controls that cause the computer-generated representation of the subject or fictional character to perform the limited number of poses or expressions.

Using the techniques described herein, a performance capture system produces believable, robust, and editable animations in an automated manner. The animations are believable in part due to the system matching a detailed animation model to a live subject in video using a guided recipe and perceptually relevant cues that are perceptually important to reproduce details of the subject's features. Robust animations are produced as a result of the system handling noisy data using projection techniques. The animations are editable because the resulting adjustable controls are applied on an animation model that can be adjusted as needed.

According to at least one example, a computer-implemented method may be provided for determining control values for controlling features of a computer-generated representation of a subject based on a performance of the subject. The method includes obtaining input data corresponding to a pose performed by the subject, the input data including position information defining positions on a face of the subject, and obtaining an animation model for the subject, the animation model including adjustable controls that control the animation model to define facial features of the computer-generated representation of the face. The method further includes matching one or more of the positions on the face with one or more corresponding positions on the animation model, wherein matching includes using an objective function to project an error onto a control space of the animation model. The method further includes determining, using the projected error and one or more constraints on the adjustable controls, one or more values for one or more of the adjustable controls, the one or more values being configured to control the animation model to cause the computer-generated representation of the face to perform a representation of the pose using the one or more adjustable controls.

In some embodiments, a system may be provided for determining control values for controlling features of a computer-generated representation of a subject based on a performance of the subject. The system includes a memory storing a plurality of instructions and one or more processors. The one or more processors are configurable to: obtain input data corresponding to a pose performed by the subject, the input data including position information defining positions on a face of the subject; obtain an animation model for the subject, the animation model including adjustable controls that control the animation model to define facial features of the computer-generated representation of the face; match one or more of the positions on the face with one or more corresponding positions on the animation model, wherein matching includes using an objective function to project an error onto a control space of the animation model; and determine, using the projected error and one or more constraints on the adjustable controls, one or more values for one or more of the adjustable controls, the one or more values being configured to control the animation model to cause the computer-generated representation of the face to perform a representation of the pose using the one or more adjustable controls.

In some embodiments, a computer-readable memory storing a plurality of instructions executable by one or more processors may be provided. The plurality of instructions comprise: instructions that cause the one or more processors to obtain input data corresponding to a pose performed by the subject, the input data including position information defining positions on a face of the subject; instructions that cause the one or more processors to obtain an animation model for the subject, the animation model including adjustable controls that control the animation model to define facial features of the computer-generated representation of the face; instructions that cause the one or more processors to match one or more of the positions on the face with one or more corresponding positions on the animation model, wherein matching includes using an objective function to project an error onto a control space of the animation model; and instructions that cause the one or more processors to determine, using the projected error and one or more constraints on the adjustable controls, one or more values for one or more of the adjustable controls, the one or more values being configured to control the animation model to cause the computer-generated representation of the face to perform a representation of the pose using the one or more adjustable controls.

In some embodiments, matching the one or more positions on the face with the corresponding positions on the animation model using the objective function includes: determining a vector between a position on the face and a corresponding position on the animation model, wherein the vector represents the error; and projecting the vector representing the error onto the control space of the animation model.

In some embodiments, projecting the vector onto the control space of the animation model includes: determining a first error projection, including determining a first dot product of the determined vector and the first vector along a direction of the first vector, the first vector representing a first adjustable control of the animation model; determining a second error projection, including determining a second dot product of the determined vector, minus the first error projection, and a second vector along a direction of the second vector, the second vector representing a second adjustable control of the animation model; and adding the first error projection and the second error projection.

In some embodiments, the one or more constraints include one or more of a complimentary constraint that prevents two or more of the adjustable controls from being simultaneously used for controlling a facial feature, a limit constraint that limits an amount by which an adjustable control can be adjusted to a range of values, a velocity constraint that limits an amount by which an adjustable control can change between successive frames, and a symmetric constraint that combines two or more controls.

In some embodiments, the method, system, and computer-readable memory described above may further include determining the one or more values for the one or more of the adjustable controls using an animation guide that is specific to the subject, wherein the animation guide limits the adjustable controls that can be used to control the facial features for the subject.

In some embodiments, the input data further includes contour information defining one or more contours of the face. In such embodiments, the method, system, and computer-readable memory described above may further include minimizing a distance between at least one of the one or more contours of the face and data representing one or more corresponding contours of the animation model. In some embodiments, the contour information defining the one or more contours of the face includes two-dimensional data. In some embodiments, the one or more contours of the face include an inner eye contour of the subject or an inner mouth contour of the subject.

In some embodiments, minimizing the distance between the at least one contour of the face and the one or more corresponding contours of the animation model includes matching edges of the at least one contour of the face with the one or more corresponding contours of the animation model.

In some embodiments, the positions on the face are determined from markers applied to the face.

In some embodiments, the input data is determined from video data of the face of the subject, and wherein the video data is received from one or more head-mounted cameras. In some embodiments, the position information defining positions on the face includes two-dimensional data and three-dimensional data, the two-dimensional data corresponding to positions on the face that are visible from one of the one or more head-mounted cameras, and the three-dimensional data corresponding to positions on the face that are visible from two of the one or more head-mounted cameras.

In some embodiments, the animation model includes one or more blendshapes that are configured to change the facial features of the computer-generated representation of the face, and wherein the adjustable controls are configured to control the blendshapes.

In some embodiments, the method, system, and computer-readable memory described above may further include outputting the values for the one or more adjustable controls for controlling an animated representation of a character using a character animation model, the character animation model including adjustable controls that control the character animation model to define facial features of the animated representation of the character, wherein the outputted one or more values are configured to control the character animation model to cause the animated representation of the character to perform the representation of the pose.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF DRAWINGS

Illustrative embodiments of the present invention are described in detail below with reference to the following drawing figures.

DETAILED DESCRIPTION

Figure 1:
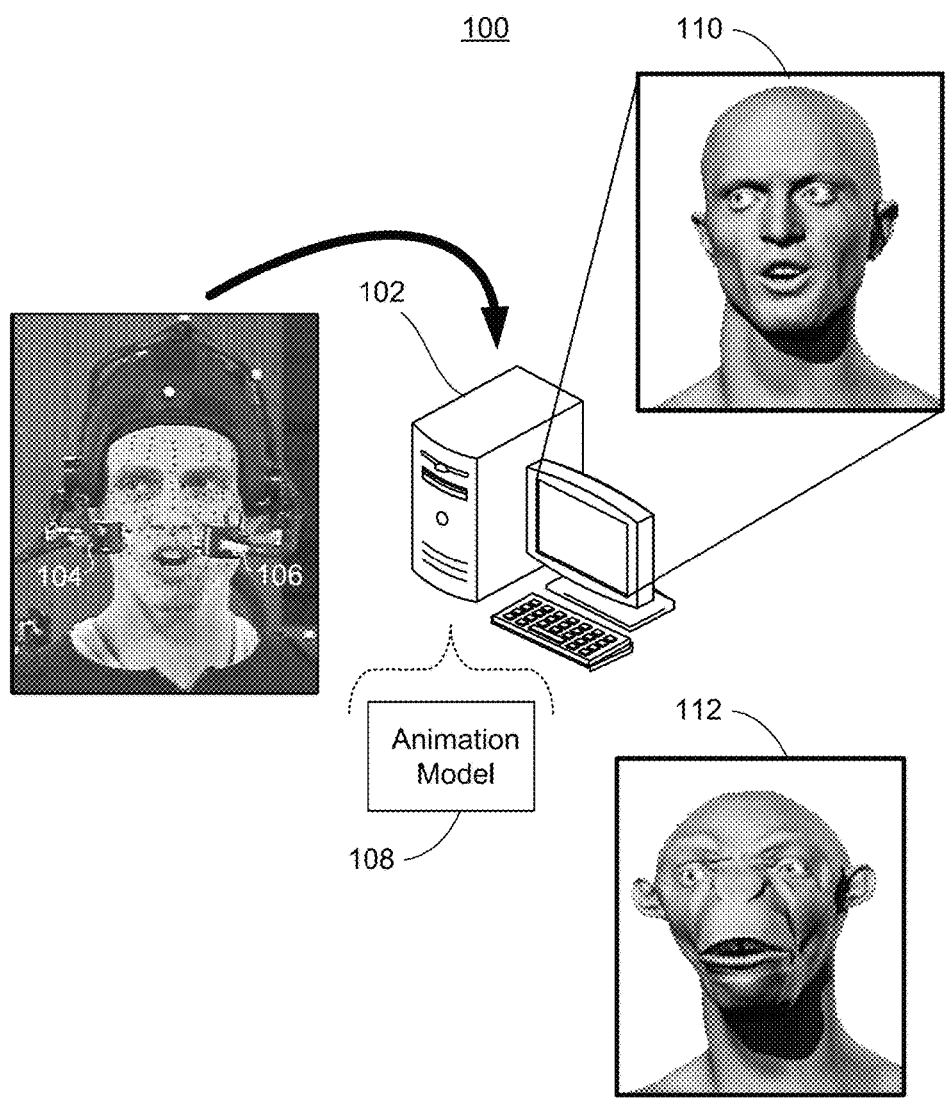
FIG. 1 illustrates an example of a system for capturing a performance of a subject using facial motion information and an animation model.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Multimedia productions, such as movies, television shows, and games, oftentimes include computer-generated or digital characters. These characters may include humans, fictional characters or creatures, or other characters. A goal in the animation industry is to render realistic and believable animations that capture the detailed, nuanced features of the subject or actor playing the digital character. The face of the subject includes numerous subtleties as the subject performs different poses. Viewers of content rely heavily on the facial expressions of the subject to understand the nonverbal communications. Therefore, capturing a detailed and accurate representation of the subject's facial features during a performance is essential in creating a realistic animation of the subject. Transfer of the performance of the subject onto a computer-generated character can be a complex and difficult process.

One or more embodiments described herein include techniques for capturing performance characteristics of a subject and producing believable, robust, and editable animations in an automated manner. In some examples, one or more techniques may be provided for capturing substantially realistic facial expressions of a subject. For example, images of facial expressions of the subject may be captured by one or more cameras, optical scanners, or other image capture devices. Input data (e.g., position information, contour information, or other suitable input data) corresponding to one or more poses performed by the subject may be computed from the images, and may be processed to generate an animation model that mathematically defines the shape of the underlying asset, such as a computer-generated representation of the subject. The animation model may include an adjustable three dimensional numerical mesh. Once generated, the animation model can be used for various applications. For example, the animation model may be used to track the subject during a performance and produce realistic representations of the captured facial expressions of the subject. In another example, the animation model may be used to track and transfer the facial performance of the subject to an animated character (in a process referred to as re-targeting). One of ordinary skill in the art will appreciate that the animation model may be used for other suitable applications.

Some embodiments described herein are directed to capturing characteristics of a subject's face during a performance. However, the techniques are not limited to facial performance characteristics, and may be used to capture other characteristics of a subject during a performance.

FIG. 1 is a block diagram illustrating an example of an animation system 100. The animation system 100 captures facial expressions of a subject, such as an actor, and uses the captured expressions to produce an animation model 108. Once generated, the animation model 108 can be controlled to cause a computer-generated representation 110 of the subject's face to perform the captured expressions or other expressions. By processing the captured expressions together, the animation model 108 can modify the computer-generated representation 110 to accurately represent the facial expressions depicted in the captured imagery.

One or more techniques may be implemented for determining facial expressions of the subject. The animation system 100 can capture imagery, such as video images of facial expressions of the subject, and can create the animation model 108 using the captured imagery. For example, a computer system 102 is in communication with one or more image capture devices that can be used to capture images of the subject's face. In one example, a head-mounted pair of cameras 104, 106 may be used to capture the images of the subject's face from two distinct perspectives. The one or more image capture devices may capture the images of the subject's face and may provide data that represents the images to the computer system 102.

In some embodiments, an image capture setup may be implemented in which a relatively sparse set of features associated with the subject's face is used for attaining position information (e.g., represented in a rectangular coordinate system). In some examples, the features of the subject's face may be highlighted artificially. For example, positions on a subject's face may be obtained using markers attached to the position locations on the face, fluorescent paint applied to the position locations on the face, or the like. In some examples, the features may include natural facial features, such as wrinkles located in the corner of an eye, the ridge of a subject's nose, or other natural features. Combinations of artificial and natural facial features may also be obtained from the images. The features may be captured at different camera views or perspectives and may be captured using multiple image capture devices (e.g., head-mounted cameras 104, 106). Once obtained, the position information may be used for constructing the animation model 108 of the subject's face and/or for controlling the animation model 108 to define facial features of the computer-generated representation 110 of the subject's face to match the subject's performance.

In the example illustrated in FIG. 1, a sparse set of artificial markers have been applied to the subject to highlight facial features. For example, the artificial markers are adhered in a pattern across the subject's face. One of ordinary skill in the art will appreciate, however, that other methodologies may be implemented. For example, one or more types of paint may be applied to the subject's face, or some other appropriate methodology may be used to highlight facial features in the captured images. In some embodiments, highlighting techniques may not be used for some facial features, such as facial features that are distinct enough so that artificial highlighting is not needed. The computing system 102 may compute the position information using the markers in the captured images (e.g., a two-dimensional point in screen space, a three-dimensional point using triangulation or trilateration, or other suitable location determination technique). Details relating to a determination of the position information are described further below.

In some instances, the sparse set of markers may be unable to provide sufficient detail to allow the computing system 102 to reconstruct the small nuances expressed by the subject, such as when the subject performs a pose or expression with a subtle emotion. For example, areas around the eyelids and the mouth are often found to be problematic in animation due to frequent self-occlusions seen from the camera. Based on the missing detail and not correctly conveying the emotion, additional time may be needed from animators, editors, or other animation personnel to manually add in the appropriate level of needed detail. Rather than relying on such time consuming manual operations to apply corrective action, the animation system 100 is able to capture such nuances by also using contour information. The contour information is associated with silhouette contours representing moveable boundaries of the subject's skin. Examples of such contours include the subject's eyelids, the subject's inner mouth or lip, the subject's nostrils, or other places on the subject's face where the skin of the face separates from another part of the face. Other contours may include less dramatic contours, such as the outer mouth or lip, the eyebrow line, the nasal labial fold, the nostril lines, or the like. In some instances, tracking and matching the movement of a given occluding contour is difficult because its location on the skin may often change position and in some instances, rapidly or constantly change position. For example, when the subject is talking, the subject's inner mouth may move in a rapid manner. However, effectively using one or more of the contours when tracking the subject's performance, the animation model 108 may be capable of more effectively matching the actual shape and motion of the subject's facial features during a performance, such as the lips during a dialogue and replicating eye blinks throughout the performance. The computing system 102 may compute the contour information based on contours detected in the captured images (e.g., using occluding edge computations and matching techniques). Details relating to a determination of the contour information are described further below.

The animation model 108 produced from the position information and the contour information may include various components. For example, the animation model 108 may implement a collection of deformable geometries that correspond to various shapes of the subject's face. In one example, the shapes may be patterned after human facial muscles. The shapes may also be referred to as blendshapes. The shapes may have geometries that can be controlled, adjusted, deformed, or weighted, alone or in combination with other shapes, so the animation model 108 is able to represent a particular facial expression from a range of expressions (e.g., expressions included in one or more poses of the subject's performance). The animation model 108 can use the resulting shape geometries to define facial features of the computer-generated representation 110 of the subject's face to match the facial features of the subject during the performance.

Figure 2:
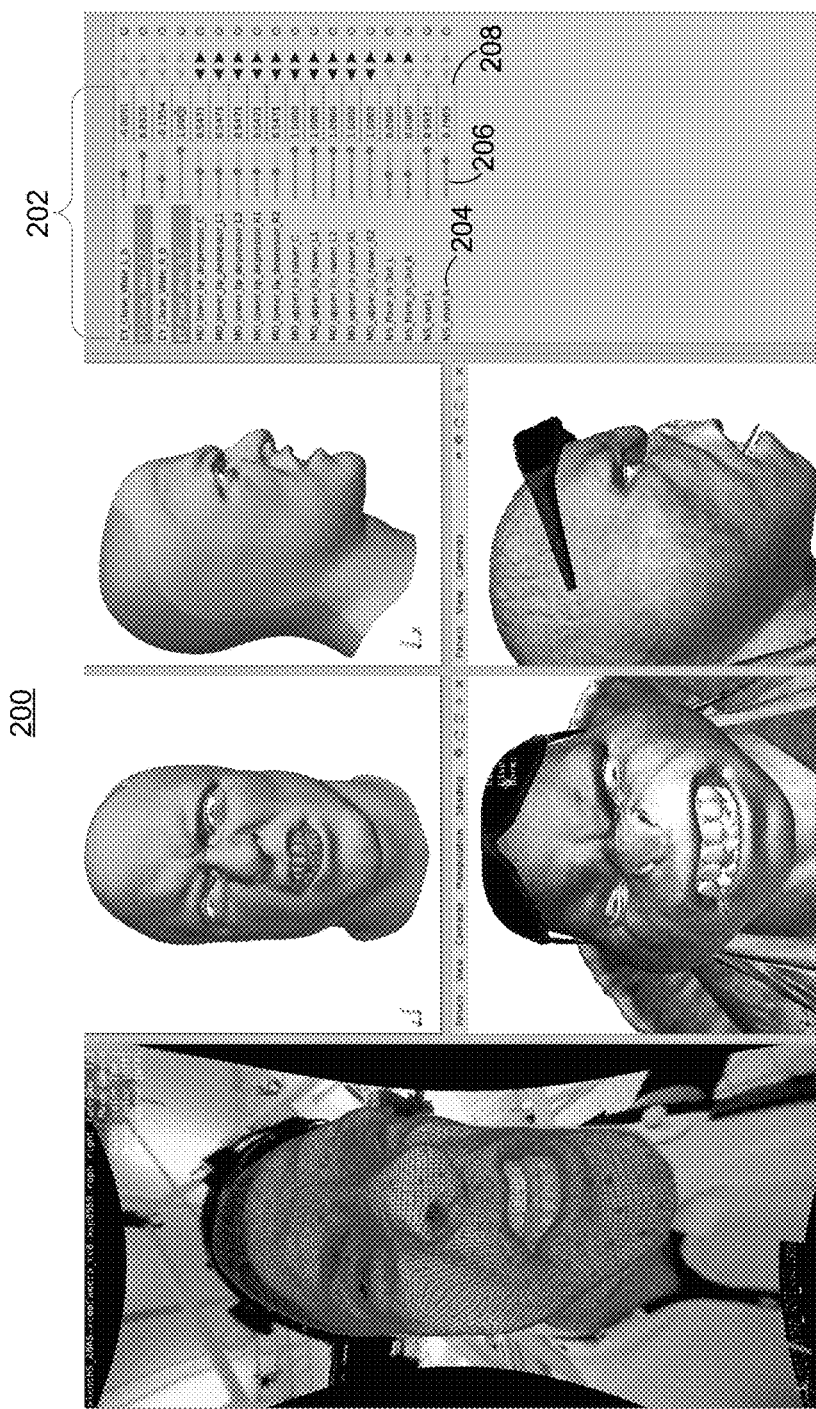
FIG. 2 illustrates an example of a graphical interface with graphical elements representing adjustable controls of an animation model.

The animation model 108 may also include adjustable controls that control the animation model 108. For example, the adjustable controls can define the geometries of the shapes of the animation model 108. In some embodiments, the adjustable controls may be represented on a graphical interface by a slider, a dial, or some other control mechanism that allows manual adjustment of a control. FIG. 2 illustrates a graphical interface 200 with graphical elements 202 representing one example of a set of adjustable controls that control an animation model of a subject. In some examples, an adjustable control may control a group of shapes to achieve different expressions. In some examples, a separate adjustable control may exist for a shape. In one example, a control represented by graphical element 204 may define a geometry for one or more shapes of the animation model 108 that control the subject's nose. For example, adjustment of the slider 206 and/or the value 208 for the control may cause the right side of the subject's nose to snarl more or less depending on the amount of the value 208. Other adjustable controls may control all or part of the subject's eyes, all or part of the subject's mouth, all or other portions of the subject's nose, or any other portion of the subject's face. The values for the adjustable controls represented by graphical elements 202 may go from 0 to 1, from −1 to 1, or any other range of values. For example, a range of values may include 0 for a minimum amount and 1 for a maximum amount. As another example, a range of values may include −1 for a maximum in one dimension or direction and a 1 for a maximum in another dimension or direction. For example, a −1 value for an adjustable control for a mouth may cause the mouth to frown by causing the corners of the mouth to go downward, whereas a +1 value for the same adjustable control may cause the mouth to smile by causing the corners of the mouth to go upward. One of ordinary skill in the art will appreciate that other control ranges may be used and that different control ranges may be used for different adjustable controls.

Returning to FIG. 1, the adjustable controls (e.g., adjustable controls represented by graphical elements 202) control the animation model 108 to define the facial features of the computer-generated representation 110 of the subject's face. In some embodiments, the animation model 108 is highly redundant with a large number of adjustable controls for the subject's face. As described below with respect to FIG. 3, a solver 306 is used to determine control values for one or more of the adjustable controls. The large number of adjustable controls that are available provides the solver 306 with numerous degrees of freedom to achieve a desired facial feature or expression. For example, the corner of the mouth can be pulled around by many different adjustable controls in the animation model 108. Movement of the mouth corner could be caused, for example, by several different controls at different control values. In one example, an expression by a subject in a given frame may be a grimace when the subject is portraying an upset emotion. To a human animator or editor, the expression may be defined using certain adjustable controls that intuitively cause the animation model 108 to express a grimace. However, due to the large degrees of freedom given to the solver 306 to choose which adjustable controls to use, the solver 306 can achieve the same grimace expression using a combination of other adjustable controls, such as an adjustable control that causes a mouth to widen combined with an adjustable control that causes the corners of the mouth to move down. While the resulting expression might match the expression of the subject in the frame, the resulting control values may not make sense to animation personnel that may need to edit or do further work using the animation model 108.

Figure 3:
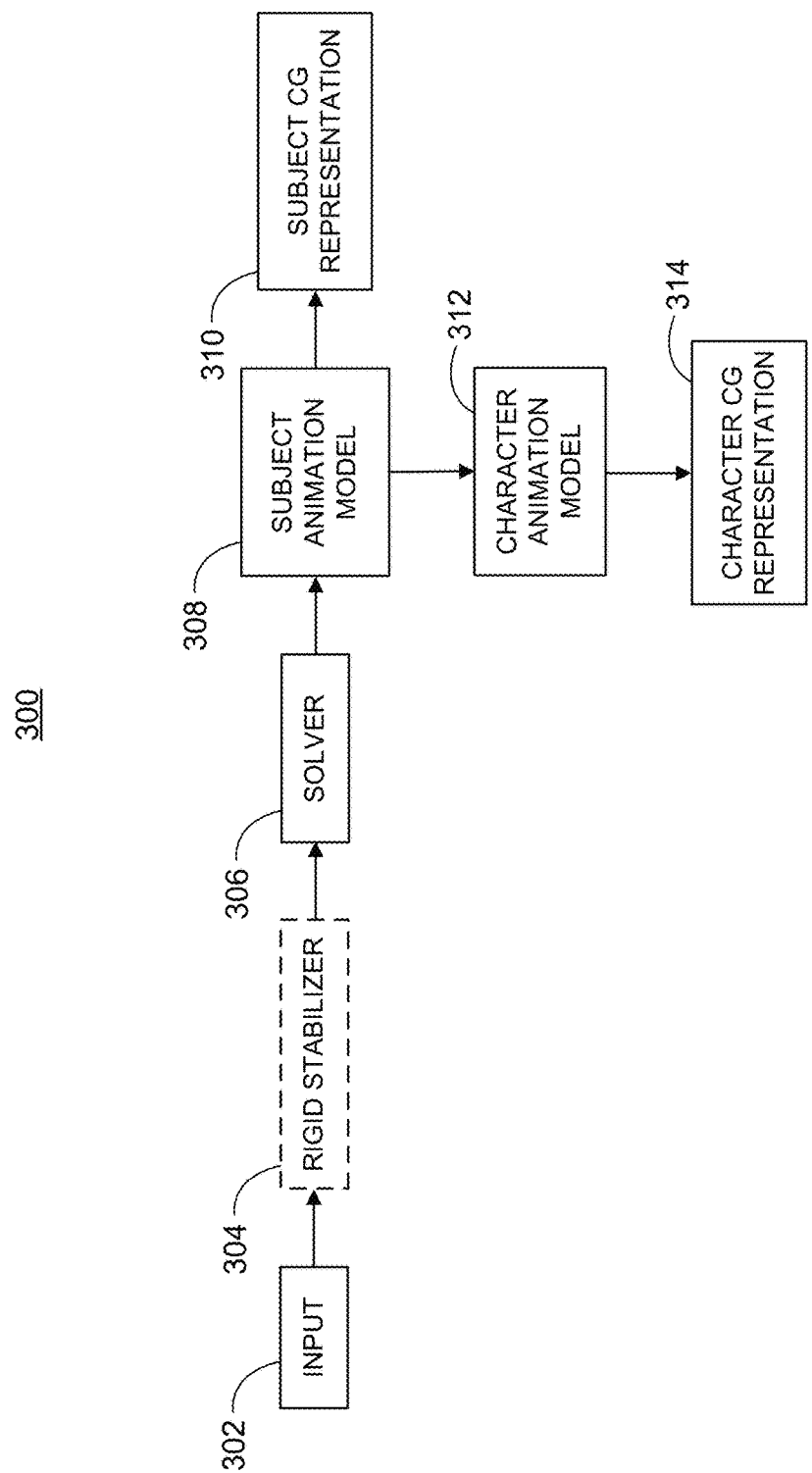
FIG. 3 illustrates an example of a system for capturing a performance of a subject by determining control values of an animation model.

Techniques described herein are provided for automatically determining values for the adjustable controls, while ensuring that the combination of control values for the adjustable controls are intuitive and make sense to an animator, editor, or other animation personnel. Referring to FIG. 3, a system 300 is provided for capturing a performance of a subject. The system 300 may determine control values of a subject animation model 308 in an automated manner. The subject animation model 308 may be similar to the animation model 108 described with respect to FIG. 1. In some examples, a solver 306 may determine values for the adjustable controls of a subject animation model 308 using the input data (e.g., the position information and/or contour information) computed from the captured images of the subject during a performance. The input data may be provided by input 302. The input 302, for example, may include a computer system (e.g., computer system 102) that computes the position information and contour information from the captured images. Different control values for the adjustable controls allow the subject animation model 308 to define different facial feature configurations of a subject computer-generated representation 310. The values for the different adjustable controls are used to control the features of the subject computer-generated representation 310 to match the features of the subject during the captured performance. In some instances, when the system 300 is used to transfer the facial performance of the subject to an animated character played by the subject (animated character 112 of FIG. 1), the control values can be used to determine control values for a character animation model 312. For example, the control values from the subject animation model 308 can be transferred to the character animation model 312. The values can then be used by the character animation model 312 to define the features of a character computer-generated representation 314 (or animation model) of the animated character. Further details relating to the solver 306 will be described with respect to FIG. 4.

In some embodiments, a rigid stabilizer 304 may be used to factor out noise due to movement of the one or more image capture devices relative to the subject's face. For example, the head-mounted pair of cameras 104, 106 may shake relative to the subject's face when the subject is in motion. The solver 306 determines the position information and contour information by determining a change in various points on the subject's face. When there is movement of an image capture device (e.g., head-mounted cameras 104, 106) relative to the subject's face, the points in the image may change relative to the face, and may be construed by the solver 306 as facial movement. The rigid stabilizer 304 can be used to factor out the detected movement that is detected based on movement of the capture device relative to the face. The rigid stabilizer 304 may include a solver that tracks portions of the subject's face that are visible by a camera and that are static and stay relatively still relative to the subject's skull as the skin moves. For example, visible and static portions of a face include teeth, the bridge of the nose, the jaw line, eye corners and markers on ears, or other portions of the face that are relatively static. One or more of these portions of the subject's face may be used by the solver. In one example, a solver of the rigid stabilizer 304 may utilize the upper teeth for the rigid stabilization. In order to achieve the rigid stabilization, a neutral face mesh and virtual head-mounted cameras (or other image capture device) with a background plate may be placed in three-dimensional (3D) space. A reference frame may then be locked on the neutral face mesh, and the rigid stabilization process may be performed to find the relative motion of the head-mounted cameras with respect to the face mesh. The upper teeth are rigidly connected to the skull, and the 3D motion of the upper teeth provides the translation movement information of the head relative to the head-mounted cameras. A marker may be created and tracked on the tip of the frontal upper teeth in the two-dimensional (2D) plate whenever the marker is visible from the head-mounted cameras. The solver of the rigid stabilizer 304 may then be used for finding the best camera movement by matching the tracked marker on the 2D plate with the projection of the corresponding 3D upper teeth bundle on the face mesh. For other relatively static portions on the face, the camera movements may be similarly solved for.

Once the capture device motion is factored out using the rigid stabilizer 304, the resulting input data can be matched to the subject animation model 308. The rigid stabilizer 304 is optional, as indicated by the dotted lines in FIG. 3, and in some embodiments may be excluded from the system 300.

Figure 4:
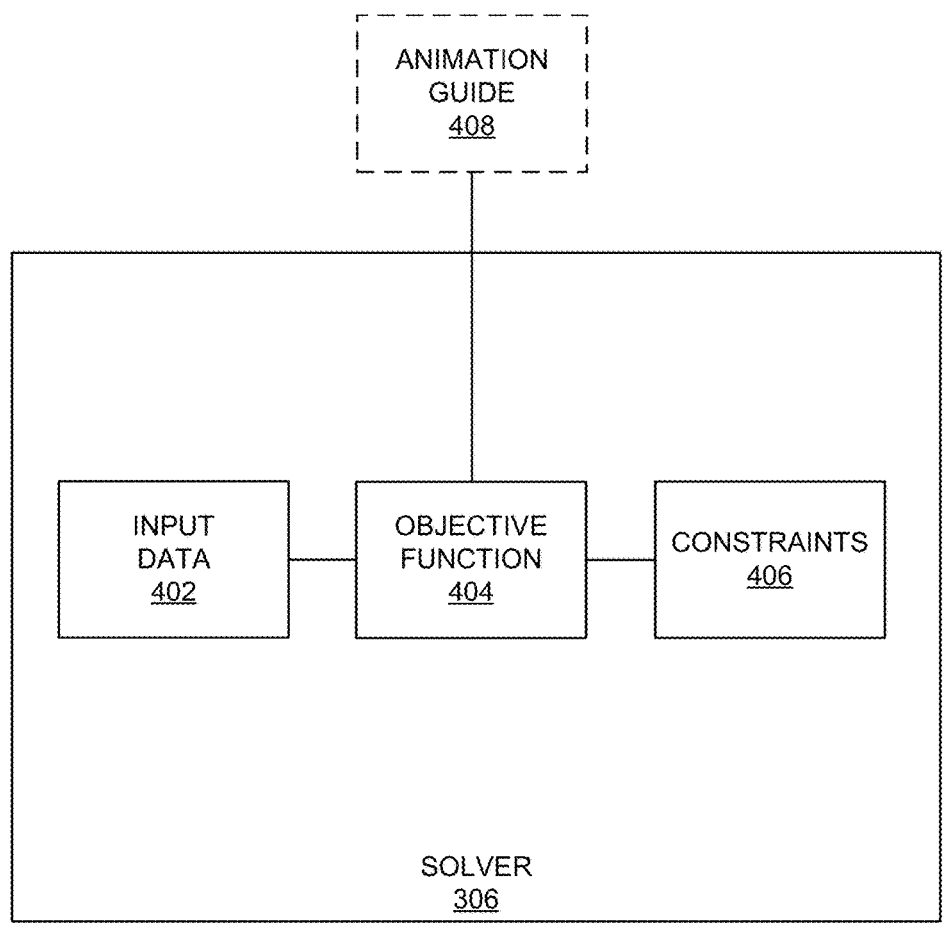
FIG. 4 illustrates an example of a solver used in capturing a performance of a subject.

FIG. 4 illustrates an example of the solver 306. The solver 306 uses input data 402 for each frame as an input to an objective function 404 to match the animation model 308 to the input data 402, and to determine or solve for values for the adjustable controls of the subject animation model 308 for each frame. The solver 306 also uses constraints 406, which will be described further below.

In some examples, the input data 402 includes position information and/or contour information computed from the captured images of the subject during a performance. The input data 402 may be determined by a computer system (e.g., computer system 102) that computes the position information and contour information from the captured images. The computer system 102 can receive the captured images of the subject's facial performance from the head-mounted cameras 104, 106. For example, referring to FIG.

5(a), a single image 500 is presented from the video frames captured by the head-mounted camera 104 for capturing the right side of the subject's face. The position information may be estimated from the captured image 500 using one or more techniques for tracking the markers applied to the subject's face. For example, the computer system 102 may execute a pattern tracking algorithm to track each marker on the subject's face. Some markers are visible by one of the head-mounted cameras 104 or 106, and some of the markers are visible by both head-mounted cameras 104, 106. For example, the markers represented with circles 502 indicate markers captured only by the camera 104 mounted to capture the right side of the subject's face. The computer system 102 can use these markers to determine two-dimensional (2D) position information. For example, the location of a marker (e.g., as a {row, column} in screen space) may be determined and used as the 2D point position. The crossed lines 504 represent markers captured by both the camera 104 positioned to capture the right side of the face and the camera 106 positioned to capture the left side of the face. The computer system 102 can use the image data from both cameras 104, 106 to determine three-dimensional position information. For example, the 3D position of the markers that that are visible from both cameras 104, 106 may be determined using a geometric triangulation. In such an example, the computer system 202 may take the data from the two cameras 104, 106 for a given marker, and can triangulate the location using the two points. In some embodiments, the cameras 104, 106 can be calibrated to obtain intrinsic parameters (e.g., focal length, camera center, scale, or other suitable parameters) and extrinsic parameters (e.g., translation, rotation, or other suitable parameters) of the cameras 104, 106. The intrinsic and extrinsic parameters allow computation of the 3D position of the markers that are visible from both cameras 104, 106 using a geometric triangulation.

Once the position information of the input data is determined, the solver 306 matches the two-dimensional points and three-dimensional points determined using the facial markers with corresponding positions or points on the subject animation model 308. To match the points on the subject animation model 308 with the two-dimensional points of the markers viewed by one of the cameras 104, 106 (represented by the circles 502), the objective function 404 calculates corresponding points on a neutral expression mesh for the markers capable of providing two-dimensional position information (represented by the circles 202). For example, a point x on the mesh surface may be represented by barycentric coordinates: x=AX, where A is the barycentric coordinates in matrix form, and X is a vector of the vertices of the mesh. For a given two-dimensional marker m (viewable from one of the cameras 104, 106) and the corresponding point x on the mesh surface, a fitting error is defined as their distance on an image plane.

$$c_m(x) = \begin{bmatrix} dot(Q_2, x)\tilde{m}_x - \langle Q_0, x \rangle \\ dot(Q_2, x)\tilde{m}_y - \langle Q_1, x \rangle \end{bmatrix} \quad (1)$$

where dot(,) denotes dot product, and $Q_i$ denotes the rows of the camera projection matrix Q. This constraint is linear in the vertex positions X.

For the markers that can be viewed by both cameras 104, 106 represented by the crossed lines 204, one or more techniques may be implemented to match the mesh with the three-dimensional positions or points of those markers. For example, a bundle adjustment technique may be used for estimating the positions of these markers along with a constraint to fit a bundle $\tilde{p}$.

$$c_p(X) = AX - \tilde{p} \quad (2)$$

The three-dimensional bundle constraint is also linear in X. In general, available markers are typically used for each frame or image, so the number of constraints may vary across frames.

Figure 6:
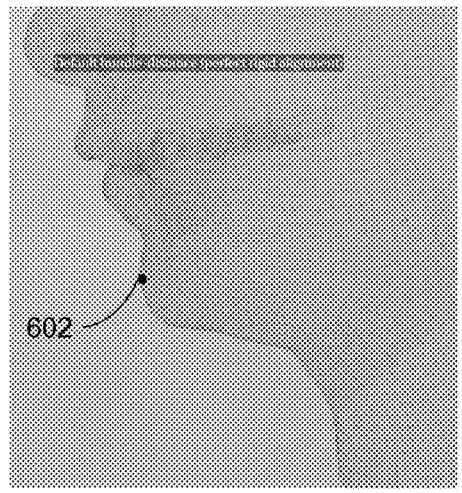
FIGS. 6(a)-6(d) illustrate examples of determined positions of a marker.
Figure 6:
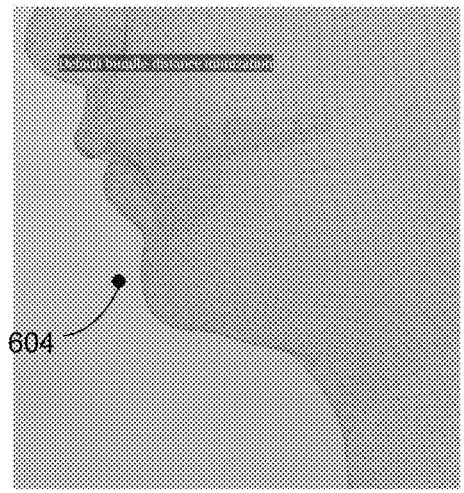
Figure 6:
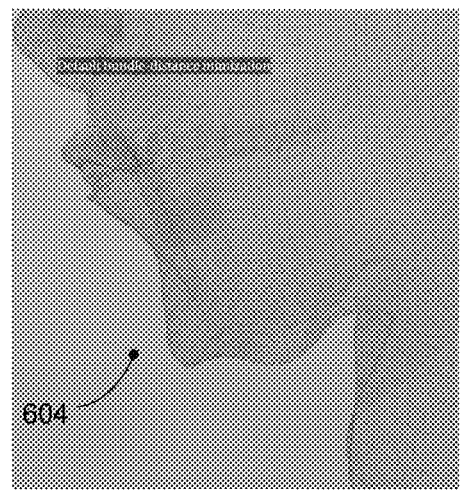
Figure 6:
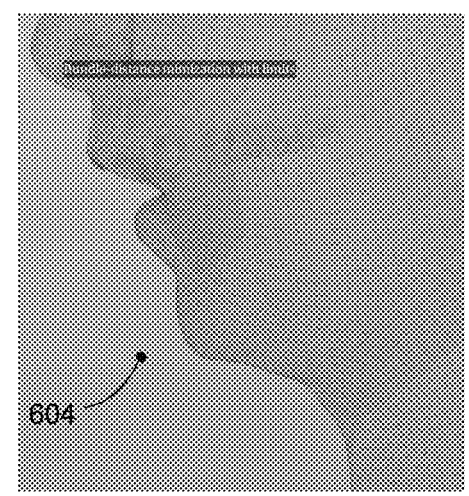

In some cases, noise may be present in the position information for the determined three-dimensional points of the markers viewed by both of the cameras 104, 106 (represented by the crossed lines 504). For example, one source of noise is the slip between a helmet holding the head-mounted cameras 104, 106 and the subject's head. The noise is especially prevalent when the subject is moving around during a performance. Another source of noise may occur if a capture device uses a fish eye lens. Fish eye lenses introduce distortion artifacts that vary spatially across the face. Minimizing a distance between points on the subject's animation model and the noisy position data can produce noisy and visually jarring artifacts on the solved results. FIGS. 6(a)-6(d) illustrates examples of a determined position (or "bundle") of a marker that appears to stray away from a subject's facial surface due to noise. FIG. 6(a) illustrates a determined position 602 that is aligned with the subject's facial surface. However, FIG. 6(b) shows a determined position 604 that appears to deviate from the surface of the subject's face due to noise in the input position data.

Figure 7:
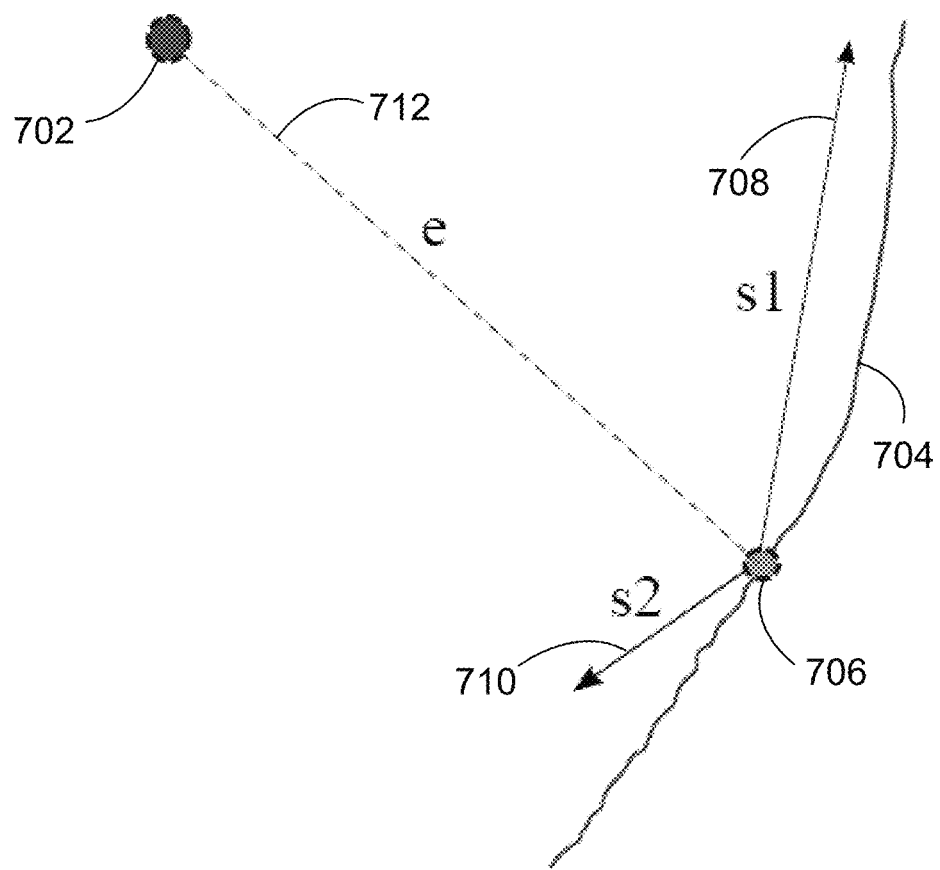
FIG. 7 is an example of a diagram illustrating a projection technique.

The solver 306 may use the objective function 404 to perform a projection technique to formulate the surface error and the resulting control values while being robust to noise in the tracked points from the markers in the images. For example, the objective function 404 may project the three-dimensional error into a local control space spanned by the gradients of the adjustable controls of the subject animation model 308. This projected error presents the solver 306 with a target position that is valid and reachable by the adjustable controls, even if the three-dimensional target position is outside the space of the animation model. FIG. 7 provides a diagram illustrating the projection technique. The position 702 is a determined position of a marker on the subject's face that the solver 306 will try to match to a point on the subject animation model 308. For example, the point 702 may be triangulated using the marker information in an image received from the two cameras 104, 106, as described above. The line 704 represents the surface of the subject animation model 308. The position 706 is a point on the surface of the subject animation model 308 that the solver 306 is trying to match to the position 702. In the example of FIG. 7, the solver 306 uses adjustable controls 708 and 710 (e.g., of the subject animation model 308) denoted by vectors s1 and s2 to try to match the position 706 to position 702. While only two adjustable controls 708 and 710 are illustrated in FIG. 7, one of ordinary skill in the art will appreciate that one or many adjustable controls may be used to match the position 706 to the position 702. Furthermore, in some embodiments, the number of vectors is equal to the number of active controls in the animation model that is being solved for, and thus one of ordinary skill in the art will appreciate that one or many vectors may be used.

The dotted line 712 represents a determined error. For example, the error represented by line 712 may be determined by measuring the distance between the position 702 and the position 706 to obtain the length of the dotted line. As seen in FIG. 7, the position 702 is located at a far enough distance from the position 706 that the solver 306 may not be able to match the position 706 of the animation model 308 to the position 702 using the adjustable controls 708 and 710. For example, adjustable control 708 may only be able to move the position 706 slightly up and out toward the position 702, but not a distance required to reach position 702. Similarly, the adjustable control 710 may only be able to move the position 706 slightly down and out toward the position 702. A situation thus arises in which controls of the animation model 308, at any given point and time, can move the position 706 in one or more predefined directions, but because of the amount of the error 712, a combination of controls 708 and 710 cannot match the position 706 with the position 702.

The solver 306 uses the objective function 404 to match the position 706 on the animation model 308 with the position 702 by projecting the error 712 onto a control space of the subject animation model 308. For example, the objective function 404 may determine a vector for the error 712, and may project the vector for the error 712 onto the control vectors s1 and s2 representing the adjustable controls 708 and 710 of the subject animation model 308. The error 712 vector may be projected onto the vector s1 (representing the adjustable control 708) to obtain a first error projection represented by the equation:

$$e1 = \text{dot}(e, s1) * s1 \quad (3)$$

Where the first error projection e1 is determined by performing a dot product of the error 712 vector and the vector s1 along the direction of the vector s1. In some embodiments, the magnitude of the vector s1 may be used in the above equation.

The error 712 vector may then be projected onto the vector s2 (representing the adjustable control 710) to obtain a second error projection represented by the equation:

$$e2 = \text{dot}((e-e1), s2) * s2 \quad (4)$$

Where the second error projection e2 is determined by performing a dot product of the error 712 vector, minus the first error projection e1, and the vector s2 along the direction of the vector s2. In some embodiments, the magnitude of the vector s2 may be used in the above equation.

The solver 306 may then use the objective function 404 to add the first error projection e1 and the second error projection e2 to determine a total projected error e_proj for the position 702 according to the following equation:

$$e\_proj = e1 + e2 \quad (5)$$

Where e_proj is the error projections e1 and e2 added together. The total projected error e_proj for the position 702 represents a local control space around the position 706. The objective function 404 can perform error minimization using the total projected error e_proj to match the position 706 of the animation model 308 to the projected position 702. This total projected error e_proj presents the solver 306 with a target position that is valid and reachable by the adjustable controls 708 and 710, even if the actual three-dimensional target position 702 is outside the reachable space of the animation model 308. Better animation results are achieved using the above projection technique versus minimizing or optimizing for the error 712. While only two adjustable controls 708 and 710 are illustrated in FIG. 7 for illustration, the subject animation model 308 may have many more adjustable controls. The above projection technique can be used for any number of adjustable controls s, from s=1, 2, 3, 4, . . . n.

Returning to FIGS. 6(a)-6(d), FIG. 6(b) shows a determined position 604 that appears to deviate from the surface of the subject's face due to noise present in the position information for the determined three-dimensional points viewed by both cameras 104, 106 (represented by the crossed lines 504). FIG. 6(c) illustrates an animation result for a given frame that occurs when the error 712 is minimized or optimized. FIG. 6(d) illustrates an animation result for the same frame that occurs when the above-described projection technique is performed to project the error 712 onto the control space of the subject animation model 308. As can be seen, the chin and mouth of the subject in FIG. 6(d) better represent the chin and the mouth of the actual subject during a performance as compared to FIG. 6(c).

Figure 5:
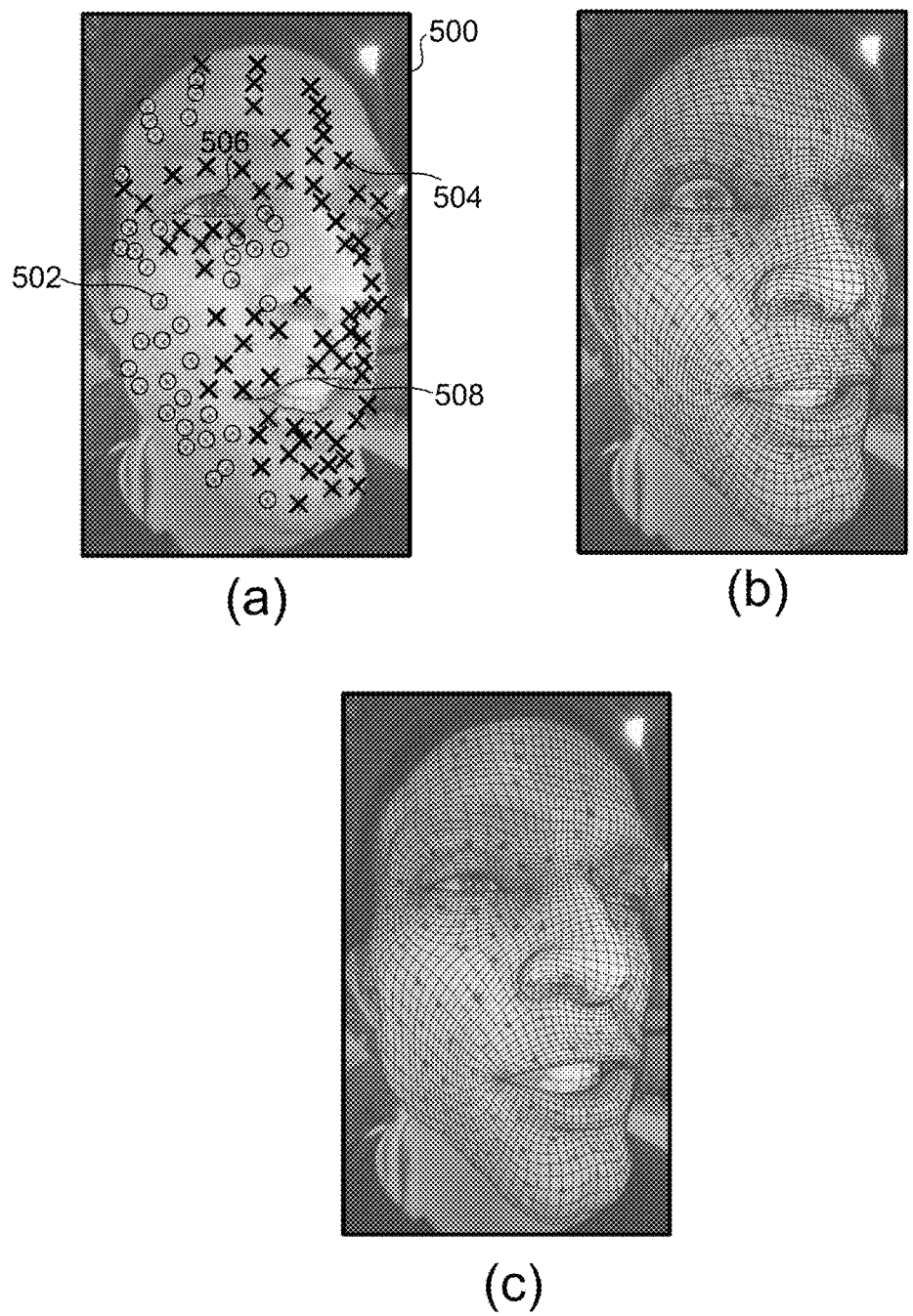
FIGS. 5(a)-5(c) illustrate collected information used for producing a model capable of representing facial expressions of a subject.
Figure 8:
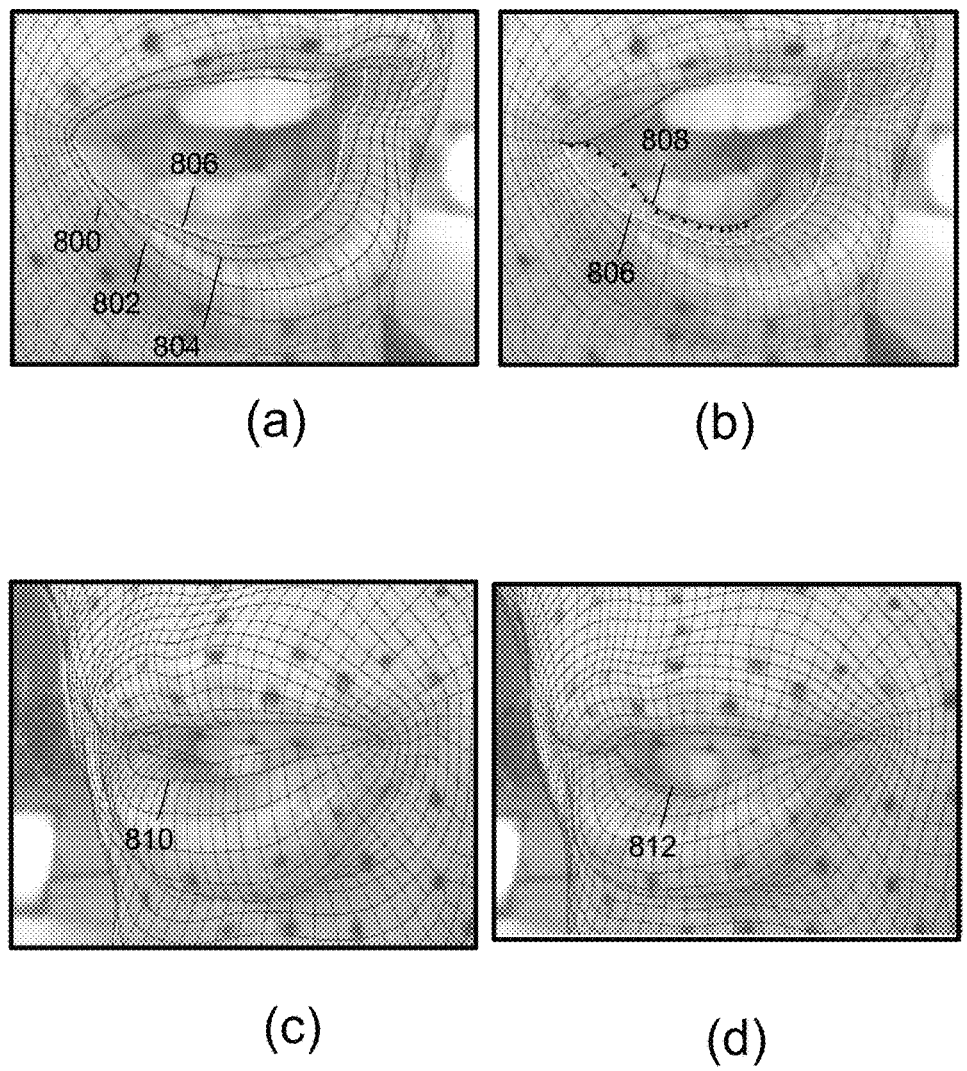
FIGS. 8(a)-8(d) illustrate contours of a subject's mouth.

In addition to the position information determined from the markers, contour information can be determined for facial features represented in the image. For example, FIG. 5(a) shows a contour 506 including an outline of upper and lower lids of the subject's right eye. As another example, contour 508 outlines a silhouette of the inner lips of the subject, which emanates from the corner of the subject's mouth and extends to the center of the mouth. Unlike fixed contours for outer lips or nasolabial folds, contours such as contour 508 are free to slide on the mesh surface. For example, the silhouette of the inner mouth changes as the subject speaks. One or more techniques may be implemented for defining the contours represented in the image 500 (or other images). For example, the contours may be manually defined by an animator, editor, or other animation personnel, or may be automatically defined by one or more processes (e.g., executed by the computer system 102). In some aspects, data that represents the contours (e.g., coordinates that define a contour) may be used (e.g., by the computer system 102) along with other information (described below) for producing an animation model. In some aspects, data representing contours may be processed prior to being used in model production. For example, one or more quantities that represent a correspondence between a contour and one or more mesh edges may be defined and used by the computer system for model production. Referring briefly to FIG. 8(a), in the mouth region of the subject, a series of looped-shaped curves 800, 802, 804, 806 are highlighted that may be used. As shown in FIG. 8(b), a silhouette contour 808 (also referred to as an occluding contour) is defined as an edge that represents a boundary between the visible and hidden portion of the subject's mouth. Since the geometry of the subject's lips typically changes with time, such curves and silhouette contours change from image to image (e.g., from frame to frame in a video) and are defined for each image. After a silhouette contour has been defined and a particular curve (e.g., curve 800, 802, 804, or 806) is selected, a correspondence between the silhouette contour and selected curve can be defined. In one embodiment, a correspondence may be defined by projecting the vertices of the silhouette contour 808 and aligning end-points of the contour 808 with end-points of a selected curve 806. In some embodiments, rather than using a single curve, multiple curves may be used for tracking a mouth area. For example, two curve segments may be used for tracking a lower lip and two segments may be used for tracking an upper lip. In one example, each segment may be defined from the middle of the respective lip to a corresponding end point of the lip. Once the points are defined, a mapping technique (e.g., an arc-length based mapping) may be used to define correspondences between the curves and the silhouette contour defined by the inner lips of the subject.

For some facial features, other information may be used for assisting with defining silhouette contours and their relation to mesh curves. For example, since eyelids slide over the surface of the cornea, the geometry of the eye may be used for projecting the eyelid curves onto the cornea to attain three-dimensional contour curve information.

The two-dimensional position information, the three-dimensional position information (determined using the projection technique described above), and the contour information are then used as input to the solver 306 and, in turn, used by the solver 306 to determine control values for adjustable controls of the subject animation model 308 that correspond to certain shape geometries. For example, for each image (e.g., a frame of video, or the like), two-dimensional marker values (as constraints), three-dimensional bundle values (as constraints), and constraints for the tracked contour curves are used to execute an optimization calculation. In general, an energy E can be considered the squared L2 error of a stack of constraint vectors. Initially, an optimization calculation is executed to solve for animation model control values w that substantially match the tracked 2D and 3D markers and the contour curves. Given a neutral mesh $b_0$ and the non-linear control basis B, the calculation attempts to fit the deformed mesh surface $X(w)=b_0+B(w)$ to the input features. The non-linear control basis B includes a non-linear function that deforms the surface $X(w)$ as a function of the animation model 308 control parameters. The optimization calculation includes:

$$\min_{w} \sum_{i=1}^{2} w_i E_i(w) \text{ s.t. } 0 \leq w \leq 1 \quad (6)$$

As provided by equation (6), two energies are fitting the 2D and 3D markers and fitting the two-dimensional contour curves respectively, with the appropriate control values w. By executing the calculation, a deformed shape, X, is produced in the animation model 308 subspace.

Returning back to FIGS. 5(a)-5(c), images are presented for comparing the ability to match the subject's face with an animation model. For example, FIG. 5(b) presents a mesh deformed by an animation model produced absent information provided from contours defined for the lips and eyes of the subject. While the mesh provides a reasonable match to facial expression of the subject, the mesh does not substantially track the lips and eye lids of the subject. In FIG. 5(c), defined contour information is included in a calculation for producing the animation model. As represented in the figure, the mesh overlaid upon the subject's facial expression provides a closer match in the eye lids. Compared to the underlying expression, the mouth region of the mesh appears to slightly deviate from the subject's mouth.

Referring to FIGS. 8(c) and 8(d), another illustration of the ability of an animation model to track the shape of a subject's mouth by using a silhouette contour is presented. FIG. 8(c) illustrates with a contour 810 in which incorrect deformations may result from an animation model constructed without one or more silhouette contours for the mouth region. Alternatively, by incorporating such silhouette contours in the production of the animation model, a closer match to the complex rolling motion of the subject's lips may be achieved as illustrated by a contour 812 in FIG. 8(d).

In some embodiments, units of the two-dimensional position information and the contour information are in pixels and the three-dimensional position information is in a three-dimensional unit of length (e.g., inches, centimeters, or some other suitable unit of length). In such embodiments, normalization may be conducted to go from pixels to the three-dimensional units, or from the three-dimensional units to pixels. For example, if a point on the subject animation model 308 is moved by one unit in three-dimensional space, the number of pixels that it projects in camera space can be measured in pixels. Using that measurement, it can be determined that one unit in three-dimensional movement along a particular direction corresponds to that many pixels.

The solver 306 may further use constraints 406 when determining the control values for the adjustable controls of the animation model 308. For example, the solver 306 may prevent the objective function 404 from adjusting control values of certain adjustable controls, or may limit the objective function 404 to accessing only certain adjustable controls. The constraints 406 operate to reduce the degrees of freedom that the solver 306 has to consider when solving for the values of the adjustable controls. In one example, the constraints may be used to limit the adjustable controls that can be used to control the animation model 308 to define features of the computer-generated representation of the subject, to constrain an amount by which the adjustable controls can be adjusted, or to place other limitations on the adjustable controls. By using the constraints when determining the values, the solver 306 may provide control values for the subject's animation model that are intuitive to an animator. For example, an animator may determine that edits to the adjustable controls are needed to achieve a different feature configuration for the computer-generated representation of the subject (or for a fictional character that is played by the subject). An intuitive set of control values allows the animator to effectively and quickly edit the adjustable controls.

One example of a constraint that can be defined includes a limit constraint that limits a range on solved adjustable control values. A limit constraint limits an amount by which the solver 306 can adjust an adjustable control to a range of values. In some examples, limit constraints may be enforced as hard constraints in the solver so that the solver 306 cannot deviate from the ranges. One example of a limit constraint includes a constraint on one or more adjustable controls that control a jaw of a subject. For example, a human jaw can rotate within a certain range (e.g., 0 to 20 degrees). Thus, a jaw constraint may limit the amount by which an adjustable control for rotating a jaw can be adjusted to a defined range (e.g., 0 to 20 degrees). In some examples, adjustable controls for a given subject may have a valid range (e.g., [−1,1] or [0,1]). Limit constraints may be enforced that limit these adjustable controls to the valid range.

Another example of constraints used by the solver 306 may include velocity constraints that limit a velocity of one or more adjustable controls from frame to frame and acceleration constraints that limit an acceleration of one or more adjustable controls from one frame to one or more successive frames. For example, a velocity constraint may limit an amount by which an adjustable control can change between successive frames. Implementing a velocity constraint ensures that temporal continuity of the solved controls is obtained between neighboring frames. In one example, a subject should not go from a zero smile (neutral face) to a full smile in two back-to-back frames. A single frame lasts for a short time duration, such as 1/24th of a second, and thus it would be unrealistic for a subject to go from a neutral expression to smile in such as short duration. In such an example, a velocity constraint may be placed on one or more adjustable controls for a subject's mouth that prevents the controls from being adjusted more than a certain amount in successive frames. A velocity constraint may include a percentage (e.g., 10%, 20%, 25%, or other suitable percentage) or number value (0.1, 0.2, 0.25, or other suitable number value) that determines the maximum by which an adjustable control value can change between successive frames.

Another example of a constraint used by the solver 306 may include a complimentary constraint that prevents two or more of the adjustable controls from being simultaneously used for controlling a facial feature. In one example, a complimentary constraint may prevent an adjustable control for inward-mouth motion (e.g., a pucker, a frown, or the like) from being used at the same time as an outward-mouth motion (e.g., a smile). In another example, a complimentary constraint may prevent an adjustable control for upper-mouth motion from being used at the same time as a lower-mouth motion. For instance, the constraint may prevent a smile from being performed at the same time as a pucker or a frown. The complimentary constraints allow a large number of adjustable controls to exist in the animation model 308, and avoid local minima problems by reducing the degrees of freedom that the solver 306 has to work with. In some embodiments, complementary controls may be parented together in a combined adjustable control. For example, a mouth adjustable control may be created that combines controls of a subject's mouth to allow expressions from a frown, to a neutral expression, and to a smile. For example, a −1 value for the adjustable control for the mouth may cause the mouth to frown, a 0 value may cause the mouth to be in a neutral expression, and a +1 value for the same adjustable control may cause the mouth to smile. As another example, complementary constraints may be created between controls that move a subject's lip corners inward versus outward. For example, a −1 value for an adjustable control may cause the mouth to do a pucker, and a +1 value for the adjustable control may cause the mouth to do a grimace. This constraint prevents the animation model 308 from puckering and grimacing at the same time.

Yet another example of a constraint used by the solver 306 may include a symmetric constraint that combines two or more controls. For example, more than one adjustable control can be used to control a portion of a subject's face. In one example, a subject's mouth may include a right side adjustable control and a left side adjustable control. Generally, people's movements are fairly symmetric. For example, a smile, frown, grimace, or other mouth expression is typically symmetric on the left and the right. Based on this principle, the solver 306 may be constrained to control the right side adjustable control and the left side adjustable control together in a symmetric manner. For example, when solving for a smile expression in an image frame, the solver 306 may solve for smile left and smile right using two different adjustable controls. A symmetric constraint may prevent the solver 306 from solving for values for the left and right adjustable controls separately, and may force the solver 306 to instead solve for one value that applies to both the left and right mouth controls. The symmetric constraint may be applied at an earlier stage of the optimization. Subsequently, this constraint may be relaxed at a later stage in the optimization to allow for non-symmetric refinement.

In some embodiments, an animation guide 408 (or "recipe") may be generated and used to guide the solver 306 in determining which adjustable controls to use, which values to use for the adjustable controls, or the like. The animation guide 408 can be generated based on the performance of the subject, and can further reduce the degrees of freedom that the solver must consider when solving for the adjustable control values. In one example, a subject (for a given scene or for an entire production) may typically perform a limited number of poses or expressions. An animation guide for that subject can be created and used to limit the adjustable controls of that subject's animation model to those controls that cause the computer-generated representation of the subject or fictional character to perform the limited number of expressions or to not perform certain expressions. For example, the subject may play a character that is always in a bad mood and that never smiles. An animation guide 408 for that character may include a list of adjustable controls and/or a list of control values that can be used for that subject and corresponding character. The list may include grimace, frown, furrow, squint, or any other appropriate expression or pose for a bad mood, and may exclude adjustable controls that would cause the subject animation model 308 or the character animation model 312 to smile. The list may also include, in some examples, values that can be used for the subject or character. For example, an adjustable control that causes the animation model 308 to produce a smile may be included, but limits on values for that adjustable control may be limited to allowing a slight smile, as opposed to a full smile.

In some embodiments, the animation guide 408 may include a file that is created based on the performance of the subject. For example, after the performance is captured, the file may be created based on the various poses and expressions in the performance. The file may be loaded into the solver 306 and used to determine which controls to use and which values can be used for those controls. In some examples, the file may be constant across an entire performance of the subject when the subject performs common poses or expressions.

Using the above-described techniques, a subject animation model is used to track a subject during a performance to provide a closely-matched representations of the subject's facial poses or expressions. A system is described that can obtain input data from an image frame capturing a subject performing a pose or expression. A solver of the system may use the input data, position determination techniques, constraints, and/or an animation guide to determine values for adjustable controls of the animation model. The values of the adjustable controls cause the animation model to recreate the pose or expression on a computer-generated representation of the subject and/or on a fictional character played by the subject. The system produces believable, robust, and editable animations in an automated manner. Believable animations are achieved in part due to the system matching a detailed animation model to a live subject in video using a guided recipe and perceptually relevant cues that are perceptually important to reproduce details of the subject's features. The resulting animations are robust as a result of the system handling noisy data using the projection techniques described above. The adjustable controls of the animation model can be adjusted as needed by animation personnel, making the animations editable as needed.

Figure 9:
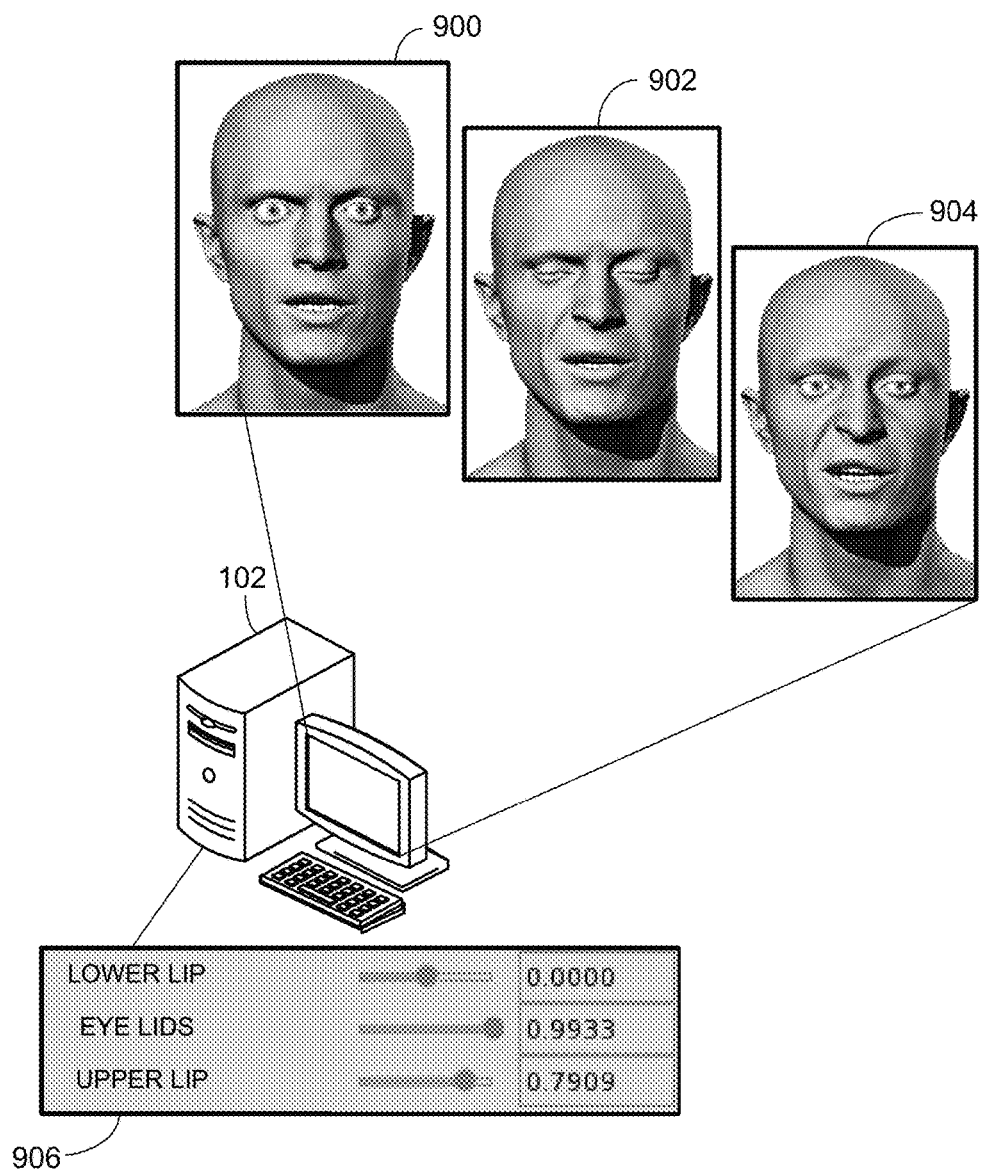
FIG. 9 illustrates editing expressions provided by a model of a subject's face.

Once control values for adjustable controls of the animation model are determined using a solver, as described above, the resulting animation model can cause a computer-generated representation of the subject's face to perform the tracked poses. Furthermore, an animation model also provides for other functionality, such as editability by an animator or other animation personnel. Referring to FIG. 9, three images 900, 902, 904 are presented of a subject animation model shows different facial expressions of a subject. Image 900 presents an initial facial expression of the subject in which both eyes are in open positions along with the subject's mouth. By allowing blendshapes associated with the animation model to be adjusted using one or more control mechanisms of a graphical interface associated with one or more adjustable controls, the presented facial expression may be edited. For example, as shown in image 902, adjustments may be made to certain adjustable controls 906 for placing the eye lids in a closed position and the upper lip in a slightly raised position. In image 904, other adjustments may be made to the adjustable controls to raise both eyebrows and to raise the upper lip even higher. Once edited, the adjustable controls control the animation model to define the expressions performed by the computer-generated representation of the subject.

Figure 10:
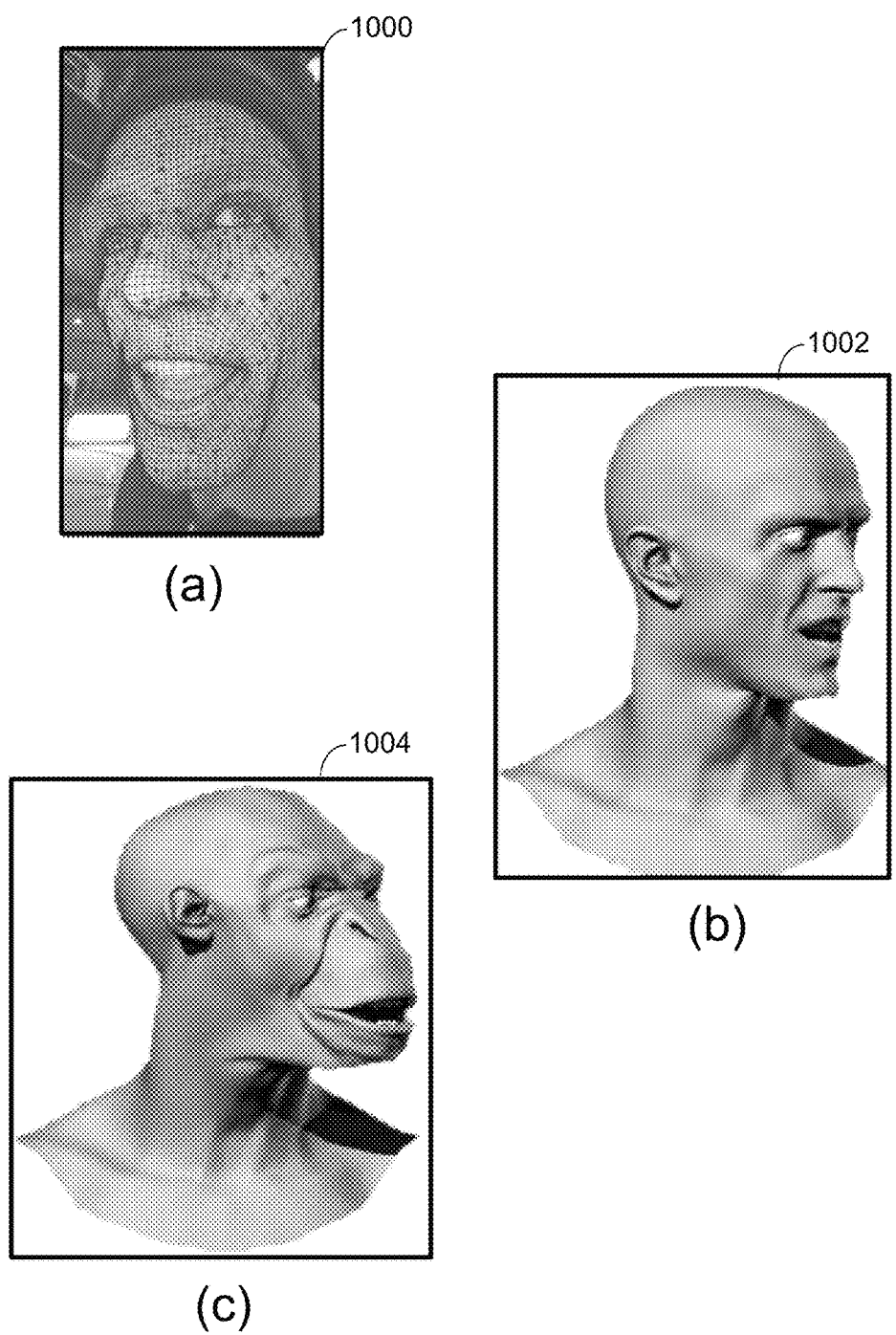
FIGS. 10(a)-10(c) illustrate mapping a subject's facial expression to a representation of the subject and a representation of a character.

An animation model for a subject may also be used for retargeting the subject's performance to a character played by the subject. For example, the performance may be retargeted for animating the face of a fictional character or creature using the animation model. Referring to FIGS. 10(a)-10(c), a facial expression provided by a captured video frame 1000 may be detected and used to determine control values for adjustable controls of a subject's animation model (as described above), resulting in a corresponding expression being performed by a computer-generated representation of the subject, as illustrated in image 1002. The control values may be transferred to a creature's animation model, as illustrated in image 1004. One or more techniques may be implemented for transferring the control values associated with subject's animation model to the animation model associated with the creature. For example, the creature's animation model may have the same animation controls as those of the subject's animation model. In such an example, the control values for each adjustable control of the subject's animation model may be copied and pasted to the corresponding adjustable controls of the creature's animation model. By retargeting the control values, the subject's performance is re-created on the geometry of the computer-generated representation of the creature. The creature's expressions may then be adjusted, as needed, by an animator, editor, or other animation personnel by further adjusting the control values of the creature's animation model.

Figure 11:
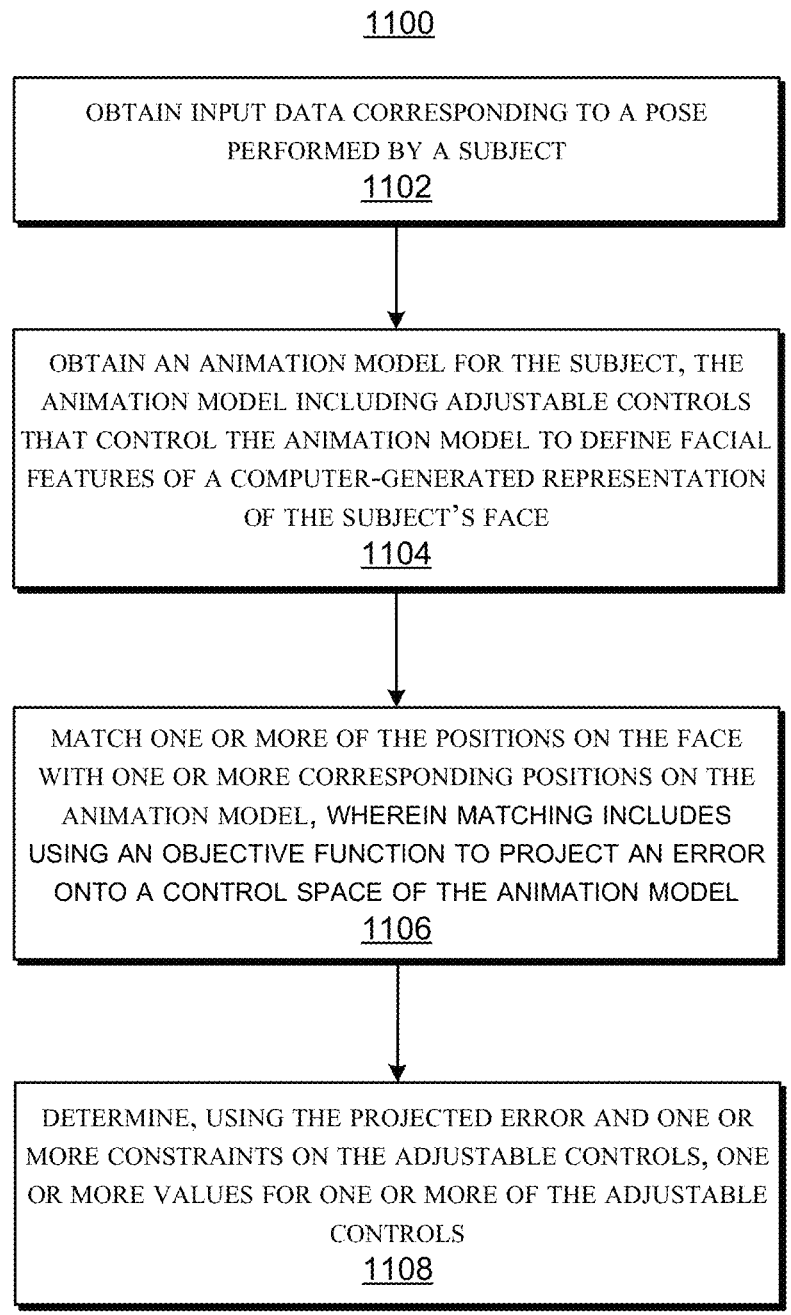
FIG. 11 is a flow chart illustrating a process for determining control values for controlling features of a computer-generated representation of a subject based on a performance of the subject.

FIG. 11 illustrates an example of a process 1100 of determining control values for controlling features of a computer-generated representation of a subject based on a performance of the subject. Process 1100 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 12:
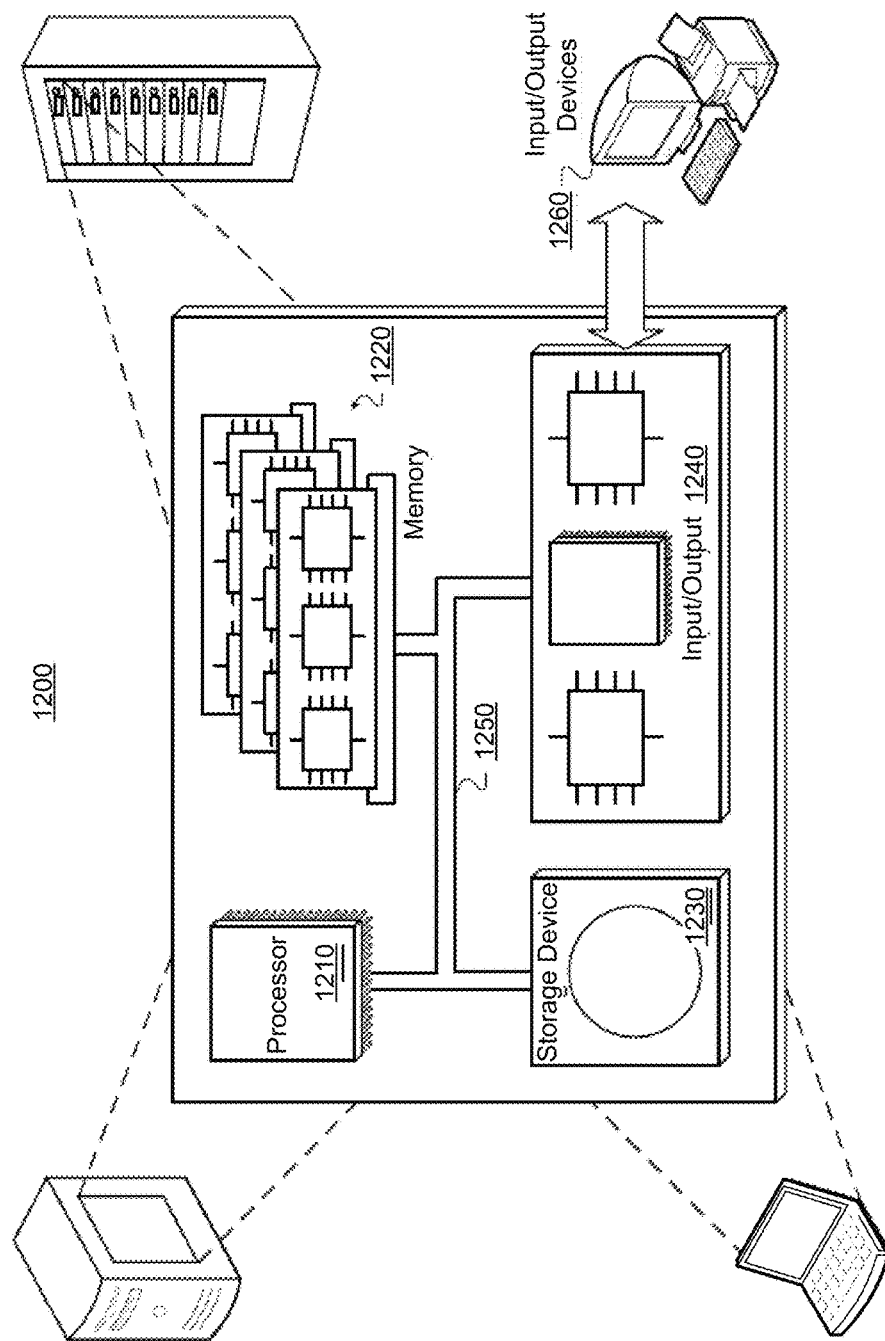
FIG. 12 shows an example of a computer system that may be used in various embodiments of the present invention.

In some aspects, the process 1100 may be performed by a computing system, such as the computer system 300 shown in FIG. 3 or the computer system 1200 shown in FIG. 12.

At 1102, the process 1100 includes obtaining input data corresponding to a pose performed by the subject, the input data including position information defining positions on a face of the subject. For example, as previously described, an image capture setup may be implemented to capture images in which a relatively sparse set of features associated with the subject's face is used for attaining position information. A computer system (e.g., computer system 102) may be used to compute the position information. A solver (e.g., solver 306) may perform step 1102 and may obtain the input data with the position information.

In some embodiments, the positions on the face are determined from markers applied to the face at a sparse set of positions. In some embodiments, the positions on the face are determined from fluorescent paint applied to the face at a sparse set of positions. The position information of the input data may be determined from video data of the subject's face with the applied markers or paint, as previously described. In some examples, the video data may be received from one or more head-mounted cameras mounted to the subject's head (e.g., head-mounted cameras 104, 106). In some embodiments, the position information defining positions on the face includes two-dimensional data and three-dimensional data. The two-dimensional data corresponds to positions on the face that are visible from one of the one or more head-mounted cameras. The three-dimensional data corresponds to positions on the face that are visible from two of the one or more head-mounted cameras.

At 1104, the process 1100 includes obtaining an animation model for the subject. The animation model includes adjustable controls that control the animation model to define facial features of the computer-generated representation of the face. The animation model (e.g., the subject animation model 308) may include one or more blendshapes that are configured to change the facial features of the computer-generated representation of the face. The adjustable controls are configured to control the blendshapes. For example, the blendshapes may have geometries that can be controlled, adjusted, deformed, or weighted, alone or in combination with other shapes, so the animation model is able to represent a particular facial expression from a range of expressions (e.g., expressions included in one or more poses of the subject's performance). The animation model can use the resulting shape geometries to define facial features of the computer-generated representation of the subject's face to match the facial features of the subject during the performance. In some embodiments, as illustrated in FIG. 2, the adjustable controls may be represented on a graphical interface by a slider, a dial, or some other control mechanism that allows manual adjustment of a control.

At 1106, the process 1100 includes matching one or more of the positions on the face with one or more corresponding positions on the animation model. The matching includes using an objective function to project an error onto a control space of the animation model. For example, using the techniques described above with respect to FIGS. 3-8, a solver may match the points on the animation model with the two-dimensional points (as seen from one camera) and the three-dimensional points (as seen from two cameras). To match the points on the animation model with the three-dimensional points, the objective function may project the error onto a control space of the animation model. For example, matching the one or more positions on the face with the corresponding positions on the animation model using the objective function may include determining a vector between a position on the face and a corresponding position on the animation model, wherein the vector represents the error, and projecting the vector representing the error onto the control space of the animation model. Projecting the vector onto the control space of the animation model may include determining a first error projection, including determining a first dot product of the determined vector and the first vector along a direction of the first vector, the first vector representing a first adjustable control of the animation model. Projecting the vector may further include determining a second error projection, including determining a second dot product of the determined vector, minus the first error projection, and a second vector along a direction of the second vector, the second vector representing a second adjustable control of the animation model. Once the first error projection and second error projection are determined, the process 1106 may include adding the first error projection and the second error projection. Further details relating to the projection technique are described with respect to FIG. 7.

At 1108, the process 1100 includes determining, using the projected error and one or more constraints on the adjustable controls, one or more values for one or more of the adjustable controls. The one or more values are configured and can be used to control the animation model to cause the computer-generated representation of the face to perform a representation of the pose using the one or more adjustable controls. In some embodiments, as previously described, the one or more constraints include one or more of a complimentary constraint that prevents two or more of the adjustable controls from being simultaneously used for controlling a facial feature, a limit constraint that limits an amount by which an adjustable control can be adjusted to a range of values, a velocity constraint that limits an amount by which an adjustable control can change between successive frames, and a symmetric constraint that combines two or more controls.

In some embodiments, an animation guide may be created for the subject. For example, the process 1000 may include determining the one or more values for the one or more of the adjustable controls using the animation guide. The animation guide is specific to the subject, and limits the adjustable controls that can be used to control the facial features for the subject. The animation guide can be used to guide the solver in determining which adjustable controls to use. In some embodiments, the animation guide can also indicate which values to use for one or more adjustable controls. As previously described, the animation guide can be generated based on the performance of the subject, and can further reduce the degrees of freedom that the solver must consider when solving for the adjustable control values.

In some embodiments, the input data obtained in step 1102 may include contour information defining one or more contours of the face. In such embodiments, the process 100 may further include minimizing a distance between at least one of the one or more contours of the face and data representing one or more corresponding contours of the animation model. The contour information defining the one or more contours of the face may include two-dimensional data that is determined in screen space. The one or more contours of the face may include an inner eye contour of the subject, an inner mouth contour of the subject, or other contours on the subject's face, as described herein. In some embodiments, minimizing the distance between the at least one contour of the face and the one or more corresponding contours of the animation model includes matching edges of the at least one contour of the face with the one or more corresponding contours of the animation model, as described with respect to FIGS. 3-8.

In some embodiments, the determined control values may be retargeted to an animation model of an animated or computer-generated representation of a character. The character may be played by the subject in a media production. For example, the process 1100 may include outputting the values for the one or more adjustable controls for controlling an animated representation of a character using a character animation model. The character animation model includes adjustable controls that control the character animation model to define facial features of the animated representation of the character. The outputted one or more values are configured to control the character animation model to cause the animated representation of the character to perform the representation of the pose.

Using the techniques described herein, a performance capture system produces believable, robust, and editable animations in an automated manner. The animations are believable in part due to the system matching a detailed animation model to a live subject in video using a guided recipe and perceptually relevant cues that are perceptually important to reproduce details of the subject's features. Robust animations are produced as a result of the system handling noisy data using the described projection techniques. The animations are editable because the resulting adjustable controls are applied on an animation model that can be adjusted as needed.

Referring to FIG. 12, a schematic diagram is shown of an example of a computer system 1200. This system is exemplary only and one having skill in the art will recognize that variations and modifications are possible. The system 1200 can be used for the operations described above. For example, the computer systems shown in FIG. 12 may be used to determine control values of an animation model based on performance capture of a subject, as described herein.

The system 1200 includes a processor 1210, a memory 1220, a storage device 1230, and an input/output interface 1240. Each of the components 1210, 1220, 1230, and 1240 are interconnected using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230 to provide graphical information via input/output interface 1240 for display on a user interface of one or more input/output device 1260.

The memory 1220 stores information within the system 1200 and may be associated with various characteristics and implementations. For example, the memory 1220 may include various types of computer-readable medium such as volatile memory, a non-volatile memory and other types of memory technology, individually or in combination.

The storage device 1230 is capable of providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1260 provides input/output operations for the system 1200. In one implementation, the input/output device 1260 includes a keyboard and/or pointing device. In another implementation, the input/output device 1260 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a local area network (LAN), a wide area network (WAN), the computers and networks forming the Internet, a cloud communications network, or a combination thereof.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

What is claimed is:

1. A computer-implemented method comprising:
   obtaining input data corresponding to a pose of a subject, the input data including position information for points on a face of the subject;
   obtaining an animation model, the animation model being associated with adjustable controls usable for adjusting the animation model to define poses for a computer representation of a face;
   determining, using the position information, a correspondence between one or more of the points on the face of the subject and one or more points of the computer representation of the face, wherein the determining includes using an objective function to project an error onto a control space of the animation model; and
   setting the one or more adjustable controls to have one or more values based on the projected error and one or more constraints for the one or more adjustable controls, wherein the setting of the one or more adjustable controls causes the computer representation of the face to have a pose based on the pose of the subject.

2. The method of claim 1, wherein determining the correspondence between the one or more of the points on the face of the subject and the one or more points of the computer representation of the face includes:
   determining a vector between a point on the face and a corresponding point of the animation model, wherein the vector represents the error; and
   projecting the vector representing the error onto the control space of the animation model.

3. The method of claim 2, wherein projecting the vector onto the control space of the animation model includes:

determining a first error projection, including determining a first dot product of the determined vector and the first vector along a direction of the first vector, the first vector representing a first adjustable control of the animation model;

determining a second error projection, including determining a second dot product of the determined vector, minus the first error projection, and a second vector along a direction of the second vector, the second vector representing a second adjustable control of the animation model; and adding the first error projection and the second error projection.

4. The method of claim 1, wherein the one or more constraints include one or more of a complimentary constraint that prevents two or more of the adjustable controls from being simultaneously used for controlling a facial feature, a limit constraint that limits an amount by which an adjustable control can be adjusted to a range of values, a velocity constraint that limits an amount by which an adjustable control can change between successive frames, and a symmetric constraint that combines two or more controls.

5. The method of claim 1, further comprising:
determining the one or more values for the one or more of the adjustable controls using an animation guide that is specific to the subject, wherein the animation guide limits the adjustable controls that can be used to control the facial features for the subject.

6. The method of claim 1, wherein the input data further includes contour information defining one or more contours of the face, and further comprising:
minimizing a distance between at least one of the one or more contours of the face and data representing one or more corresponding contours of the animation model.

7. The method of claim 6, wherein the contour information defining the one or more contours of the face includes two-dimensional data.

8. The method of claim 6, wherein the one or more contours of the face include an inner eye contour of the subject or an inner mouth contour of the subject.

9. The method of claim 6, wherein minimizing the distance between the at least one contour of the face and the one or more corresponding contours of the animation model includes matching edges of the at least one contour of the face with the one or more corresponding contours of the animation model.

10. The method of claim 1, wherein the points on the face are determined from markers applied to the face.

11. The method of claim 1, wherein the input data is determined from video data of the face of the subject, and wherein the video data is received from one or more head-mounted cameras.

12. The method of claim 11, wherein the position information for the points on the face includes two-dimensional data and three-dimensional data, the two-dimensional data corresponding to points on the face that are visible from one of the one or more head-mounted cameras, and the three-dimensional data corresponding to points on the face that are visible from two of the one or more head-mounted cameras.

13. The method of claim 1, wherein the animation model includes one or more blendshapes that are configured to change the facial features of the computer-generated representation of the face, and wherein the adjustable controls are configured to control the blendshapes.

14. The method of claim 1, further comprising outputting the values for the one or more adjustable controls for controlling an animated representation of a character using a character animation model, the character animation model including adjustable controls that control the character animation model to define facial features of the animated representation of the character, wherein the outputted one or more values are configured to control the character animation model to cause the animated representation of the character to have a pose based on the pose of the subject.

15. A system, comprising:
a memory storing a plurality of instructions; and
one or more processors configurable to:
obtain input data corresponding to a pose of a subject, the input data including position information for points on a face of the subject;
obtain an animation model, the animation model being associated with adjustable controls usable for adjusting the animation model to define poses for a computer representation of a face;
determine, using the position information, a correspondence between one or more of the points on the face of the subject and one or more points of the computer representation of the face, wherein the determining includes using an objective function to project an error onto a control space of the animation model; and
set the one or more adjustable controls to have one or more values based on the projected error and one or more constraints for the one or more adjustable controls, wherein the setting of the one or more adjustable controls causes the computer representation of the face to have a pose based on the pose of the subject.

16. The system of claim 15, wherein determining the correspondence between the one or more of the points on the face of the subject and the one or more points of the computer representation of the face includes:
determining a vector between a position on the face and a corresponding position on the animation model, wherein the vector represents the error; and
projecting the vector representing the error onto the control space of the animation model.

17. The system of claim 15, wherein the one or more constraints include one or more of a complimentary constraint that prevents two or more of the adjustable controls from being simultaneously used for controlling a facial feature, a limit constraint that limits an amount by which an adjustable control can be adjusted to a range of values, a velocity constraint that limits an amount by which an adjustable control can change between successive frames, and a symmetric constraint that combines two or more controls.

18. A non-transitory computer-readable memory storing a plurality of instructions executable by one or more processors, the plurality of instructions comprising:
instructions that cause the one or more processors to obtain input data corresponding to a pose of a subject, the input data including position information for points on a face of the subject;
instructions that cause the one or more processors to obtain an animation model, the animation model being associated with adjustable controls usable for adjusting the animation model to define poses for a computer representation of a face;
instructions that cause the one or more processors to determine, using the position information, a correspondence between one or more of the points on the face of the subject and one or more points of the computer representation of the face, wherein the determining includes using an objective function to project an error onto a control space of the animation model; and instructions that cause the one or more processors to set the one or more adjustable controls to have one or more values based on the projected error and one or more constraints for the one or more adjustable controls, wherein the setting of the one or more adjustable controls causes the computer representation of the face to have a pose based on the pose of the subject.

19. The non-transitory computer-readable memory of claim 18, wherein determining the correspondence between the one or more of the points on the face of the subject and the one or more points of the computer representation of the face includes:

determining a vector between a position on the face and a corresponding position on the animation model, wherein the vector represents the error; and projecting the vector representing the error onto the control space of the animation model.

20. The non-transitory computer-readable of claim 18, wherein the one or more constraints include one or more of a complimentary constraint that prevents two or more of the adjustable controls from being simultaneously used for controlling a facial feature, a limit constraint that limits an amount by which an adjustable control can be adjusted to a range of values, a velocity constraint that limits an amount by which an adjustable control can change between successive frames, and a symmetric constraint that combines two or more controls.

* * * * *

UNITED STATES PATENT AND TRADEMARK OFFICE
CERTIFICATE OF CORRECTION

PATENT NO. : 10,147,219 B2
APPLICATION NO. : 15/424727
DATED : December 4, 2018
INVENTOR(S) : Kiran Bhat et al.

Page 1 of 1

It is certified that error appears in the above-identified patent and that said Letters Patent is hereby corrected as shown below:

In the Claims

Column 27, Claim 20, Line 21:
Replace "20. The non-transitory computer-readable of claim 18," with --20. The non-transitory computer-readable memory of claim 18,--

Signed and Sealed this
Ninth Day of July, 2019

Andrei Iancu
*Director of the United States Patent and Trademark Office*